(12) United States Patent
McCarty

(10) Patent No.: US 6,356,944 B1
(45) Date of Patent: *Mar. 12, 2002

(54) SYSTEM AND METHOD FOR INCREASING WRITE PERFORMANCE IN A FIBRE CHANNEL ENVIRONMENT

(75) Inventor: James F. McCarty, Spring, TX (US)

(73) Assignee: Compaq Information Technologies Group, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/828,672

(22) Filed: Mar. 31, 1997

(51) Int. Cl.⁷ .................... G06F 15/177; G06F 15/16
(52) U.S. Cl. .................. 709/222; 709/227; 709/237; 709/250
(58) Field of Search ............... 395/449, 200.29; 709/233, 251, 237, 226, 222, 227, 250, 232; 370/906

(56) References Cited

U.S. PATENT DOCUMENTS

| 5,638,518 A | * | 6/1997 | Malladi | 709/251 |
| 5,742,772 A | * | 4/1998 | Sreenan | 709/226 |
| 5,745,727 A | * | 4/1998 | Chau et al. | 711/122 |
| 5,768,530 A | * | 6/1998 | Sandorfi | 709/233 |
| 5,944,798 A | * | 8/1999 | McCarty et al. | 709/251 |
| 5,954,796 A | * | 9/1999 | McCarty et al. | 709/222 |
| 5,956,723 A | * | 9/1999 | Zhu | 707/100 |
| 6,014,383 A | * | 1/2000 | McCarty | 370/453 |

OTHER PUBLICATIONS

"Operation Level Protocols for the Fiber Channel Standard"; IBM Technical Disclosure Bulletin, vol.36, No.7, Jul. 1, 1993, pp. 149–155; XP000384215; ISSN: 0018–8689.
Snively R.: "Implementing a Fibre Channel SCSI Transport"; Intellectual Leverage: Digest of Papers of the Spring Computer SOCI International Conference (COMPCON), San Francisco, Feb. 28–Mar. 4, 1994, Feb. 28, 1994, pp. 78–82, XP000479383; Institute of Electrical and Electronics Engineers ISBN: 0–8186–5380–9.

* cited by examiner

Primary Examiner—Mark H. Rinehart
Assistant Examiner—P. Kang
(74) Attorney, Agent, or Firm—Fletcher, Yoder & Van Someren

(57) ABSTRACT

A system with a plurality of devices compatible with the Fiber Channel Protocol, with at least one initiator/originator and one target/responder. The initiator/originator is provided with the capability to send both data and command frames to the target/responder to increase write performance. The target/responder allocates a portion of its Responder-Exchange-Identifiers for the write use of the initiator/originator, which manages the use of these identifiers.

12 Claims, 7 Drawing Sheets

SYSTEM AND METHOD FOR INCREASING WRITE PERFORMANCE IN A FIBRE CHANNEL ENVIRONMENT

BACKGROUND OF THE INVENTION

1. Technical Field of the Invention

The present invention relates to channel and network communication systems and processes and, in particular, to a system and method for increasing write performance in a Fibre Channel (FC) environment.

2. Description of Related Art

There are two kinds of protocols for device communication: channels and networks. Channels, for example, between a master host computer and a slave peripheral device, are designed to transport a large amount of data at very high speeds over relatively small distances with little software overhead once data transmission commences. A channel generally provides a direct or switched point-to-point connection between a master and a slave that is hardware-intensive. Networks, on the other hand, are designed to interface many users and support many transactions, sharing a plurality of hosts and system resources, over medium to large distances. With respect to networks, higher overhead is generally acceptable as long as high connectivity is achieved.

The Fibre Channel Protocol (FCP) is a new generation protocol that combines the best of these two disparate methods of communication in a single Open-Systems-Interface-like (OSI-like) stack architecture. Essentially, the Fibre Channel (FC) is a multi-topology, multi-layer stack with lower-layer-protocols (LLPs) for controlling the physical transport characteristics and upper-layer-protocols (ULPs) for mapping LLP communication to and from higher-level software structures that are compatible with an Operating System. These ULPs include both channel and network protocols such as Intelligent Peripheral Interface (IPI), Small Computer System Interface (SCSI), and Internet Protocol (IP), among others.

It is well-known that devices that engage in either channel or network communication may be categorized as initiators (also sometimes referred to as originators) or targets (also sometimes referred to as responders) or both, depending upon their functionality. Certain specific functions are assigned to either an initiator or a target: (i) an initiator can arbitrate for the communication path and select a target; (ii) a target can request the transfer of command, data, status, or other information to or from the initiator, and (iii) in some instances, a target can arbitrate for the communication path and reselect an initiator to continue a transaction.

For devices that are operable with the Fibre Channel Protocol, only those devices which have the initiator functionality may initiate what is known in the art as a Link Service Request or an Extended Link Service Request. Link Service commands provide Fibre Channel initiators with the ability to perform such tasks as Node Discovery, Abort Requests and Reject Communication frames. The only Link Service command a Fibre Channel target can initiate, for the most part, is a Reject command/frame (LS_RJT).

Typically, in a single initiator FC environment, the initiator device sends out such Link Service Commands as are needed and expects in response thereto an Acknowledgment (LS_ACK) frame or a Reject frame (LS_RJT) from a target. Hereinafter, these LS_ACK and LS_RJT frames will be collectively referred to as response frames. In a multi-initiator environment, on the other hand, an initiator operates as both a recipient and a sender of Link Service commands. Because of these twin roles, such an initiator operates as both a recipient and a sender of a response frame.

It is known in the art that effective data transmission rates are a crucial factor in a communication system. Further, such transmission rates may be critically dependent, at least in part, upon communication path latency, total number of devices and the presence of multiple initiators. In current FC-compatible systems which are typically single-initiator systems, a data write is performed sequentially by sending command frames and data frames separately from the sender to the receiver. Such sequential frame transfer may give rise to inefficient write performance, especially in longer communication paths with increased latency periods. Accordingly, it should be appreciated that there is a significant need for providing an efficient write mechanism in FC environments.

Although various single initiator FC implementations with sequential write capability have been extant for some time, no FC communication system is known that adequately addresses the above-described problems and deficiencies and/or possesses all of the advantages and novel features of the invention described and claimed hereinbelow.

SUMMARY OF THE INVENTION

The present invention overcomes the above-identified problems as well as other shortcomings and deficiencies of existing technologies by providing a method for transferring data from an originator to a responder, both of which are disposed in a Fibre Channel environment, comprising the steps of: sending a write command and at least one data frame together from the originator to the responder; and transmitting a status frame back from the responder to the originator, which status frame is provided in response to the completion of the sending step. In a preferred embodiment, the method further comprises the steps of: allocating a selected portion of a Responder-Exchange-Identifier (RX_ID) index associated with the responder, which index comprises a plurality of Responder-Exchange-Identifiers (RX_IDs) wherein the selected portion is uniquely identified with the originator; and transmitting information via a portion of payload in a Acknowledgment frame from the responder to the originator, the information being related to the selected portion.

In another aspect, the present invention is drawn to a system for transferring data in a Fibre Channel (FC) communication environment, which system comprises an originator for initiating a transfer of data; and a responder for receiving said data, wherein the responder allocates a selected portion of a plurality of Responder-Exchange-Identifiers for the exclusive use of the originator pursuant to the data transfer such that the originator can send command and data frames together to the responder.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
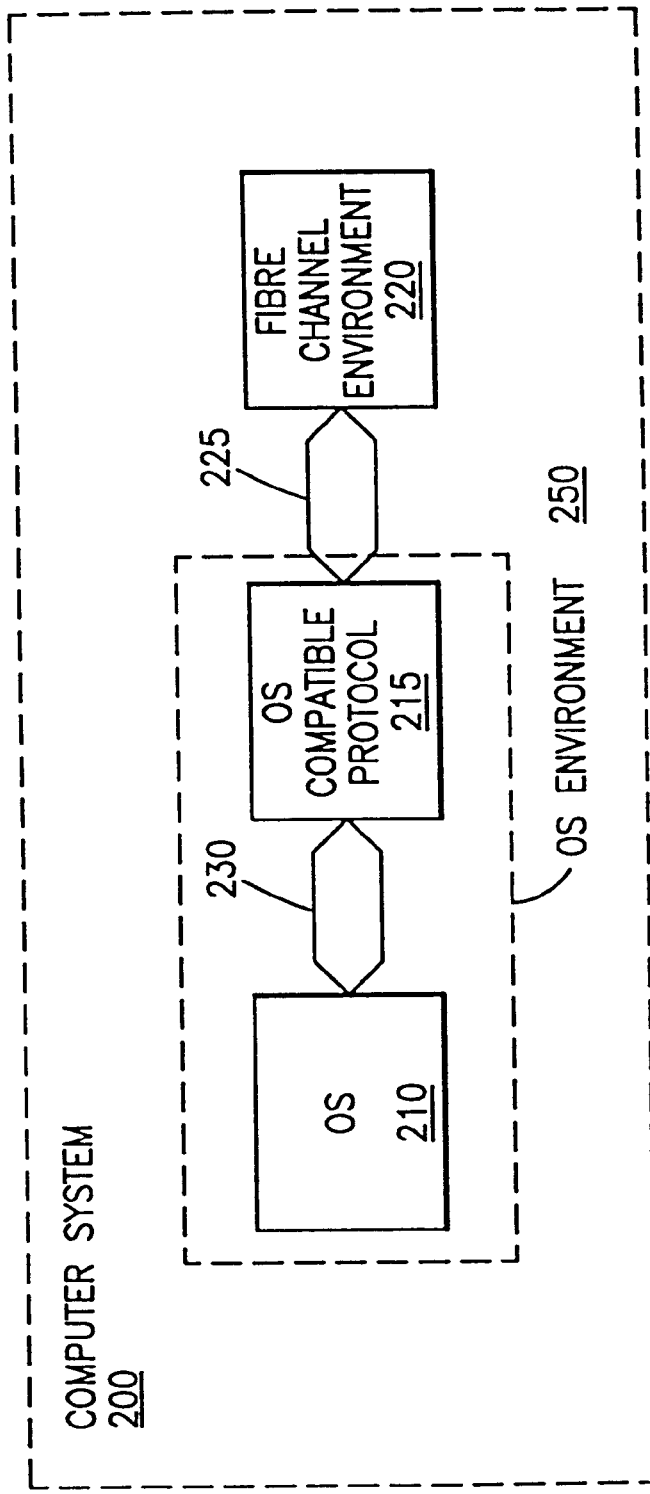
FIG. 1 illustrates a block diagram of an exemplary computer system wherein the teachings of the present invention may be practiced.

Referring now to the drawings wherein like or similar elements are designated with identical reference numerals throughout the several views, and wherein the various elements depicted are not necessarily drawn to scale, and, in particular, to FIG. 1, there is shown a block diagram of an exemplary computer system 200 wherein the teachings of the present invention may be practiced. As can be appreciated by those skilled in the art, the computer system 200 is represented in FIG. 1 in its functional aspects. An Operating System (OS) 210 is operably provided in the computer system 200 to control the information flow associated therewith. The OS 210 may be a Disk Operating System (DOS) or a Network Operating System (NOS) such as, for example, Windows NT® or NetWare®, which may be appropriate depending upon whether the computer system 200 is arranged in a network configuration.

The OS 210, moreover, is operable with at least a conventional channel communication interface such as, for example, the SCSI standard. The exemplary OS 210 may further be provided with such functional structures that would enable interoperability with conventional network communication protocols such as, for example, the Internet Protocol (IP).

Continuing to refer to FIG. 1, the exemplary OS 210 communicates with an OS-compatible channel or network communication protocol/interface 215 via an upper_level_communication path 230. It should be appreciated that the upper_level_communication path 230 in the functional block representation of the exemplary computer system 200 may encompass such OS-software structures as communication protocol drivers, for example, the SCSI protocol drivers or IP protocol drivers. The exemplary OS 210 and the OS-compatible interface/protocol 215 together constitute what will be henceforth referred to as an OS environment 250 in the computer system 200. Reference numeral 220 refers to a Fibre Channel (FC) environment which may encompass a plurality of FC devices operable in accordance with the teachings of the present invention in addition to the known Fibre Channel Protocol (FCP) architecture described below in further detail.

Still continuing to refer to FIG. 1, it can be appreciated that most Operating Systems including, for example, the OS 210, are not provided with the capability of communicating "directly" with the devices disposed in the FC environment 220. Therefore, in order to operably include and harness the benefits of the FC environment 220 in an exemplary computer system 200, a link path 225 is provided between the FC environment 220 and the OS-compatible communication interface 215.

Figure 2:
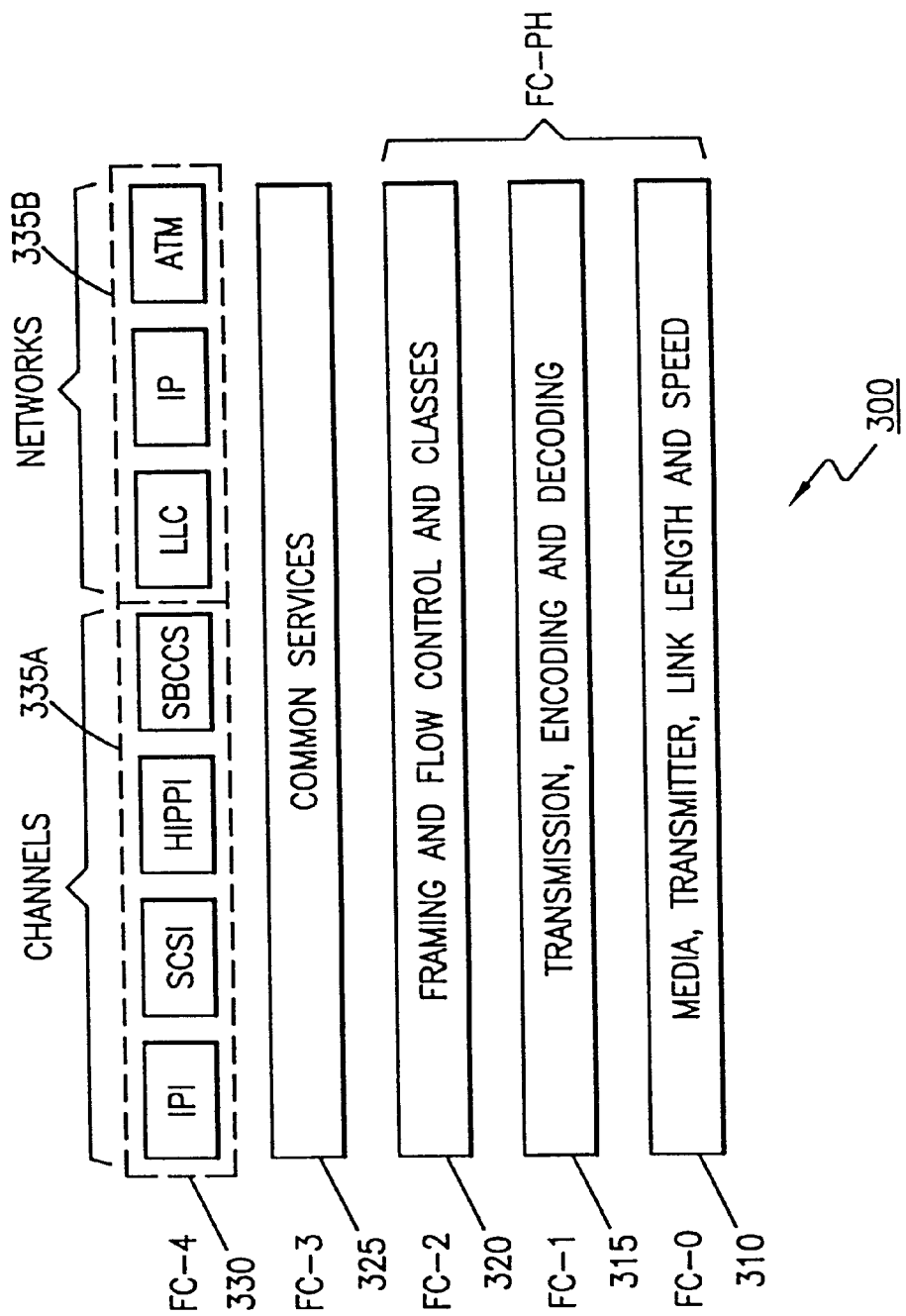
FIG. 2 depicts a diagrammatic representation of the Fibre Channel (FC) Protocol stack.

Referring now to FIG. 2, a diagrammatic representation of the FCP stack architecture is shown generally at 300. As can be readily appreciated, the FCP architecture is structured as a hierarchical set of protocol layers, much like the Open Systems Interface (OSI) stack. The three bottom layers of the FC stack (layer 310, labeled as FC-0, through layer 320, labeled as FC-2) form what is known as the Fibre Channel Physical Standard (FC-PH). This Standard defines all the physical transmission characteristics of a Fibre Channel environment including, for example, the FC environment 220 (shown in FIG. 1). The remaining layers (layer 325, labeled as FC-3 and layer 330, labeled as FC-4) handle interfaces with other network protocols and applications. Unlike the existing Local Area Network (LAN) technologies such as Ethernet and Token Ring, FC keeps the various functional layers of the stack 300 physically separate. As can be appreciated, this physical separation enables implementation of some stack functions in hardware and others in software or firmware.

The layer 310, FC-0, is the lowest functional layer of the FC architecture and describes the physical characteristics of the link connections among the plurality of FC devices disposed in the FC environment 220 (shown in FIG. 1). FC-0 supports a basic rate of 133 Mbaud, the most commonly used speed of 266 Mbaud, as well as 531 Mbaud and 1.062 Gbaud. However, because of the overhead involved in establishing and maintaining link connections, the actual data throughput is somewhat lower: 100 Mbit/s for 133 Mbaud, 200 Mbit/s for 531 Mbaud, 400 Mbit/s for 531 Mbaud, and 800 Mbit/s for 1.062 Gbaud. Further, FC-0 supports a wide range of physical cabling, including single-mode or multimode fiber-optic cable, coaxial cable, and shielded twisted pair (STP) media. Each of these cabling elements supports a range of data rates and imposes specific distance limitations, but FC can mix all of them within the same FC environment such as the FC environment 220 shown in FIG. 2. For instance, single-mode optical fiber could be used for distances up to 10 km; multimode fiber, at 200 Mbit/s, could be used for distances up to 2 km; and STP, which supports 100 Mbit/s, may be used for up to 50 meters.

The layer 315, FC-1, defines the transmission protocol, including the serial encoding and decoding rules, special characteristics, and error control. FC-1 uses an 8B/10B block code, where every 8 data bits are transmitted as a 10-bit group with two extra bits for error detection and correction, known as disparity control. The 8B/10B scheme supplies sufficient error detection and correction to permit use of low-cost transceivers, as well as timing recovery methods to reduce the risk of radio-frequency interference and ensure balanced, synchronized transmissions.

The third layer of the FC-PH, layer 320, FC-2 describes how data is transferred between the FC devices, each FC device being disposed at a "Node," and includes the definition of the frame format, frame sequences, communications protocols, and service classes. The basic unit of data transmission in Fibre Channel is a variable-sized frame. Frames can be up to 2,148 bytes in length, comprising a variable payload of up to 2,048 bytes and a selected size of overhead (also referred to as a frame header) that provides framing, source and destination port addressing, service type, and error detection information. In some embodiments, there may also be a variable optional overhead block for other miscellaneous information about the user data, that is, the payload. A single higher layer (that is, the upper layers in the stack 300) protocol message may be larger than a frame's payload capacity, in which case, the message will be fragmented into a series of related frames called a sequence.

Further description regarding FC communication frames is provided below.

Continuing to refer to FIG. 2, the FC-2 layer can be appreciated as the main "workhorse" of the FCP stack 300. It frames and sequences data from the upper layers (layers 325 and 330) for transmission via the FC-0 layer; it accepts transmissions from the FC-0 layer and reframes and resequences them, if necessary, for use by the upper layers 325 and 330. In addition to defining full duplex transmission path between two nodes, the FC-2 layer also provides essential traffic management functions, including flow control, link management, buffer memory management, and error detection and correction. An important feature of the FCP stack 300 is that the FC-2 layer defines four classes of service to meet a variety of communication needs. Class 1 Service defines hard-wired or circuit-switched connections that are dedicated, uninterruptible communication links. This service provides exclusive use of the connection for its duration (sometimes called a "selfish connection"). Class 1 Service is designed for time-critical, "non-bursty" dedicated links, such as those between two supercomputers. Class 2 Service is a connectionless, frame-switched transmission that guarantees delivery and confirms receipt of traffic. Like conventional packet-switching technologies such as frame relay, Class 2 switching is performed on the FC data frame rather than on a connection. No dedicated connection is established between the nodes; each frame is sent to its destination over any available route. When congestion occurs in Class 2 traffic, the frame is retransmitted until it successfully reaches its destination. Class 3 Service defines one-to-many connectionless frame-switched service that is similar to Class 2 Service, except that it has no delivery guarantee or confirmation mechanism. It can be appreciated that Class 3 transmissions are faster than Class 2 transmissions because they do not wait for confirmation. But if a transmission does not arrive at its destination, Class 3 Service does not retransmit. This service is most often used for real-time broadcasts that cannot wait for acknowledgment but are not sufficiently time-critical to warrant Class 1 Service. It is also used for applications that can tolerate lost frames. Class 4 Service is a connection-based service that offers guaranteed fractional bandwidth and guaranteed latency levels.

The FC-3 layer, layer 325, provides a common set of communication services of higher layer protocols above the FC-PH level. These additional services may include, for example, mechanisms for multicast and broadcast data delivery, "hunt" groups wherein more than one target node can respond to a given initiator node, and multiplexing multiple higher layer protocols and the FC-PH.

The top layer, layer 330, of the FCP stack 300 is the FC-4 layer. It defines the higher layer applications that can operate over an FC infrastructure such as, for instance, the FC environment 220 shown in FIG. 2. The FC-4 layer provides a way to utilize existing channel and network protocols over Fibre Channel without modifying those protocols. Accordingly, the FC-4 layer acts like a protocol convergence layer so that the FC node appears to provide the exact lower-layer transport services that the higher-layer channel or network protocol requires. This convergence function may require that the FC-4 layer provide additional services such as buffering, synchronization, or prioritization of data. It can be appreciated that the FC-4 functionality is encompassed in the link path 225 disposed between the FC environment 220 and the OS-compatible interface 215 of the exemplary computer system 200, shown in FIG. 1.

Still continuing to refer to FIG. 2, various FC-4 level mappings have been specified for a number of higher layer channel and network communication protocols, including: Intelligent Peripheral Interface (IPI); SCSI; High-Performance Parallel Interface (HIPPI); Single Byte Command Code Set (SBCCS); Logical Link Control (LLC); IP; and Asynchronous Transfer Mode (ATM) Adaptation Layer (AAL).

Devices that are operable with the Fibre Channel Protocol, irrespective of whether they are initiators or targets, typically include a controller (hereinafter an FC controller) that embodies the functionality of some of the middle-layers of the FCP stack 300. For example, current FC controllers typically embody the functionalities of the layers 315 and 320 (FC-1 and FC-2). On the other hand, a host computer system, such as the exemplary computer system 200 shown in FIG. 1, would be responsible for the upper-layers (FC-3 and FC-4). A Physical Link Module (PLM) such as, for example, a Gigabit Link Module (GLM) would implement the bottom-most layer 310 (FC-0).

The central mechanism for coordinating an interchange of information between two FC devices is a process that is operable at the highest level of the FC architecture and is commonly referred to in the art as an exchange. Exchanges are composed of one or more related sequences, i.e., sets of one or more related data frames transmitted from one FC device to the other. While there may be many exchanges open between two devices, typically only one sequence is active within an exchange. With respect to an exchange, the FC master and slave devices are typically referred to as an originator and responder, respectively. With respect to a sequence, the master and slave are referred to as an initiator and recipient, respectively.

Characterized by a variable length, a frame typically comprises a starting delimiter (Start of Frame, or SOF, delimiter), a frame header, certain payload, a Cyclic Redundancy Check (CRC), and an ending delimiter (End of Frame, or EOF, delimiter). The SOF and EOF contain an FC-specific Special Character are used to indicate where a frame begins and ends. The FC-specific Special Character is a 10-bit transmission character which does not have a corresponding 8-bit value (like the 8B/10B block-encoding described above), but is still considered valid.

An FC-Profile is an interoperability specification that is utilized in the industry as a set of implementation guidelines for the various FC-4 level ULP mappings. The Profiles serve as a body of rules for systems manufacturers, systems integrators, component manufacturers, and users seeking to design and select interoperable FC peripherals, hosts and components. Each Profile specifies which settings of the many aforementioned Fibre Channel physical, link-level, and ULP options are to be selected for interoperable implementation. Essentially, an FC Profile may be thought of as a vertical slice through the FC option space. The following table (Table 1) summarizes the contents of a frame header operable in an FC-SCSI Profile:

TABLE 1

| Bits Word | 31-24 | 23-16 | 15-08 | 07-00 |
|---|---|---|---|---|
| 0 | R_CTL | | D_ID | |
| 1 | rfu | | S_ID | |
| 2 | TYPE | | F_CTL | |
| 3 | SEQ_ID | DF_CTL | | SEQ_CNT |
| 4 | | OX_ID | | RX_ID |
| 5 | | | RLTV_OFF | |

The various frame header fields are described immediately as follows. The R_CTL field identifies the frame as part of an FC-Protocol operation and also identifies the information category. The D_ID identifies the destination of the frame. The D_ID transmitted by the exchange originator is the SCSI-standard target identifier. The S_ID identifies the souce of the frame and the S_ID transmitted by the exchange originator is the SCSI-standard initiator identifier. The TYPE field identifies the protocol of the frame content for Data frames. For SCSI-FCP, the value in this field would be 0x08.

Continuing with TABLE 1, the F_CTL field manages the beginning and normal or abnormal termination of sequences and exchanges. The SEQ_ID identifies each sequence between a particular exchange originator and exchange responder with a unique value. The DF_CTL indicates any optional headers that may be present, although they are not required. The SEQ_CNT field indicates the frame order within the sequence. The OX_ID field is the originator identification of the exchange for uniquely indicating (or, tagging) frames that are part of a particular exchange. The RX_ID field is the responder identification of the exchange for indicating (or, tagging) frames that are part of a particular exchange. As will be seen below, the RX_ID field in frames from an originator may be utilized in accordance with the teachings of the present invention for the purpose of facilitating an efficient write operation in which command and data frames may be sent together.

The RLTV_OFF field indicates the relative displacement of the first byte of each frame's payload with reference to the base address of the information category. For the FC-SCSI Profile, the relative offset is the SCSI-standard application client buffer offset and the base address is the beginning address of the application client's buffer.

An originator can typically handle a limited number of open exchanges. Each exchange is provided with certain resources in the originator, for example, a memory portion, frames, frame headers et cetera for facilitating the exchange process with a selected responder. These resource portions are preferably indexed by OX_IDs available for the originator.

Similarly, a responder can only handle a certain number of open exchanges each of which is associated with a resource portion in the responder. These resource portions are indexed by RX_IDs available for the responder. As can be appreciated, the responders and originators may each have a different number of open exchanges.

Figure 3A:
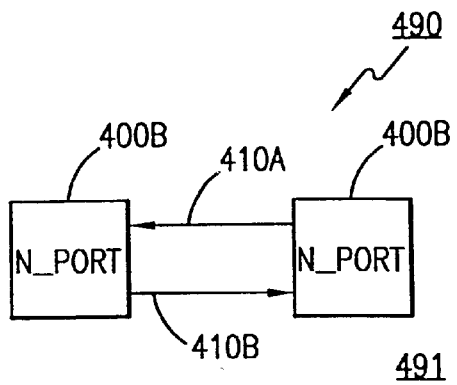
FIGS. 3A–3C depict block diagrams of the three topological configurations available for Fibre Channel Nodes.
Figure 3B:
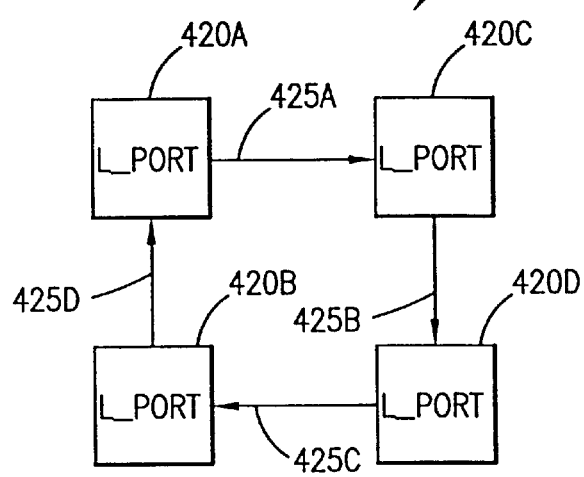
Figure 3C:
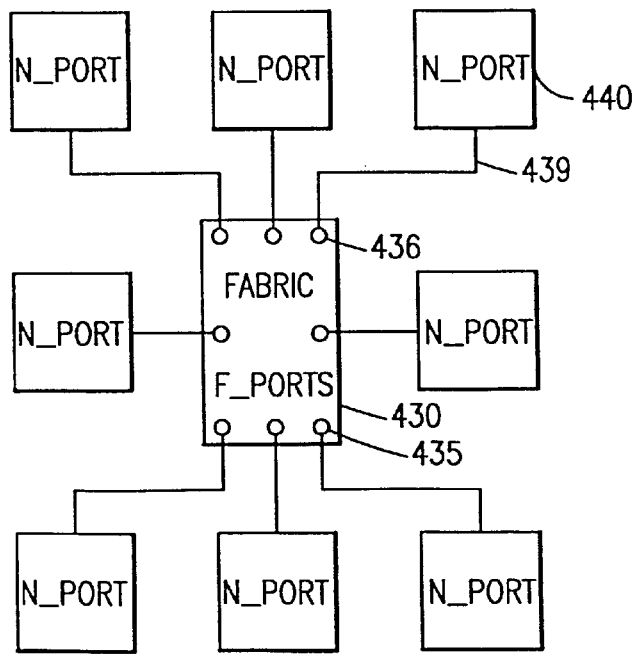

Referring now to FIGS. 3A–3C, three exemplary topological configurations are shown, generally at 490, 491, and 492, respectively, into which the FC Nodes may be arranged. A Node is an entity, system, or device that has the capability to process the ULPS, the FC-3, and some of the FC-2 functions. A Node may contain one or more ports, commonly known as Node Ports or N_Ports. An N_Port is a hardware entity within a Node that supports the FC-PH. It may act as an originator (that is, an initiator), a responder (that is, a target), or both. It should be understood that the terms Node, device and Port will be used somewhat interchangeably for the purpose of the present invention.

Reference numeral 490 refers to a point-to-point topology which utilizes communication links 410A, 410B to provide a full duplex transmission path between any two FC Nodes, denoted here as N_Ports 400A and 400B. This connection topology provides the maximum possible bandwidth and lowest latency since there are no intermediate devices/Nodes.

Reference numeral 492 refers to a switched fabric topology where each FC device or Node (N_Port) is connected to an F_Port that is part of a fabric, for example fabric 430, and receives a non-blocking data path to any other connection on the fabric. An F_port is the access point of the fabric for physically connecting to another Node. The fabric 430 may be a switch or series of switches and is responsible for routing between Nodes, error detection and correction, and flow control. The operation of the fabric 430 is independent of the higher layer communication protocols, largely distance-insensitive, and may be based on any technology.

Communication paths, for example, path 437, provide a bidirectional connection between a Node, N_Port 440 and a fabric port (F_Port) 436. The switched fabric topology 492 provides the maximum connection capability and total aggregate throughput of all the three FC topologies. It may be appreciated that the switched fabric topology 492 provides the capability to interconnect large number of systems; to sustain high bandwidth requirements; to match data rates between connections of different speeds; and to match different cabling elements.

Reference numeral 491 denotes a loop topology known in the art as an Arbitrated Loop (AL) pursuant to a connection standard referred to as the FC-AL standard. The loop topology 491 interconnects a plurality of FC devices or Nodes (denoted as loop ports or L_Ports) such as, for example, L_Ports 420A through 420D, via links 425A through 425D. Thus, this connection arrangement enables each device to use the loop topology 491 as a point-to-point connection between a sender and a receiver, irrespective of any intermediate devices disposed therebetween which merely act as "repeaters."

The arbitrated loop 491 provides a low-cost means of attaching multiple devices without the need for hubs or switches. Although only four L_Ports are shown in FIG. 4B, the loop provides shared bandwidth for up to 127 L_Ports. Each L_Port requests use of the loop when it needs to communicate with another port; if the loop is free, the requesting port sets up a bidirectional connection with the destination port. The loop protocol permits an L_Port to continuously arbitrate to access the transmission medium to transmit to another L_Port; a fairness algorithm ensures that no L_Port gets blocked from accessing the loop. Once a connection is established, it can then deliver any class of service appropriate to the traffic between the two L_Ports.

As is known in the art, only one pair of L_Ports may communicate at one time. When these L_Ports relinquish control of the loop, another point-to-point connection between two L_Ports may be established. Further, the entire loop may be attached, in turn, to a FC switch fabric port via what is known as an FL_Port, or directly to a single host system via an NL_Port.

Because the presently preferred exemplary embodiment of the present invention preferably encompasses an FC-AL topology, such as the loop topology 491, the general operation of this nodal configuration will be described in greater detail hereinbelow.

It is known that the FC-AL standard allows each FC device to negotiate for an Arbitrated Loop Physical Address (AL_PA) in a Loop Initialization process. While participating on an Arbitrated Loop, the FC devices must log in to each other before commencing a loop transaction. The login procedure is the initial procedure all communicating Nodes go through to establish service parameters and a common operating environment. One of the examples of service parameters is a "credit" limit, which represents the maximum number of outstanding frames that can be transmitted by a Port without causing a buffer overrun at the receiving Port. As can be seen, credit is a flow control mechanism that throttles link traffic by limiting the number of frames each originator Port can send. In conventional FC controllers, two types of credit are typically used: buffer-to-buffer credit (BB_Credit) and end-to-end credit (EE_Credit).

If a device is not logged in to another device, it will discard any frames it receives from that device until it is logged in. Since an initiator or driver must be able to manage the target device with which it is communicating, the initiator keeps track of an FC-specific identity triplet for that target device. This FC-specific ID triplet comprises a target's Node_Name, it's Port_Name, and it's AL_PA. While the AL_PA is dynamically assigned upon a loop reset, the Node_Name and Port_Name are formed from the device's unique World_Wide_Name.

When the devices come up onto an Arbitrated Loop upon a reset, they configure their AL_PAs in one of three ways in the Loop Initialization step. In a Soft Address scheme, the device does not care what AL_PA it is assigned. Rather, it simply accepts the first free AL_PA available. In a Preferred Address scheme, the FC device would like to be assigned a particular AL_PA. However, if a desired AL_PA is unavailable for some reason, it will accept whichever AL_PA that is free and available. For example, after a device is assigned a specific AL_PA for the first time upon "global" system initialization following the loading of the OS, that device will continue to request for that AL_PA upon subsequent loop resets. However, once this device goes off-line from the Arbitrated Loop, it will lose its ability to "prefer" that AL_PA and must resort to accepting the first free AL_PA that is available.

Thirdly, in a Hard Address scheme, the FC device can only operate at a particular AL_PA. According to the Loop Initialization Protocol (LIP) in the FC-AL Standard, which handles the configuration of the AL_PAs, this method of address configuration takes precedence over the first two methods, namely, the Soft Address and Preferred Address schemes.

The initiator FC devices can initiate a Link Service Command/Frame after all AL_PA assignment issues have been resolved. Link Service Frames include both "request" and "response" frames. Request frames are those Link Service Frames which require a receiving device to send back a response frame and include, among others, Login Link Service Frames (PLOGI), Logout Frames (PLOGO), Discover N_Port Service Parameters Frames (PDISC), Discover Address Frames (ADISC), Process Login Frames (PRLI), Process Logout Frames (PRLO), and Reinstate Recovery Qualifier Frames (RRQ).

In a single initiator environment, the initiator device sends out Link Service Frames as needed and expects in response thereto an Acknowledgment Frame (LS_ACC) or a Reject Frame (LS_RJT). Further, the initiator device keeps track of the type of Link Service Frames that are sent out by storing the type information (hereinafter "type information element") for each Link Service Frame in a storage array called outstanding link_services_array. Typically, this outstanding link_services_array comprises a plurality of storage locations each of which corresponds to a recipient device's AL_PA. Moreover, in typical embodiments, all Link Service Frame types are stored for each recipient as they are sent out.

The initial Port Discovery Process by an initiator device is a two-step process in the FC-AL environment, irrespective of whether it comprises one or more initiators. First, if the initiator is already logged into a recipient device then a PDISC frame is transmitted. Otherwise, a PLOGI frame is transmitted.

Second, if an LS_ACC frame is received back in response to a PLOGI frame, the initiator then sends a PRLI frame to that responder. On the other hand, if the LS_ACC frame is received back in response to a PDISC frame, no other frames need to be sent to that responder.

Figure 4A:
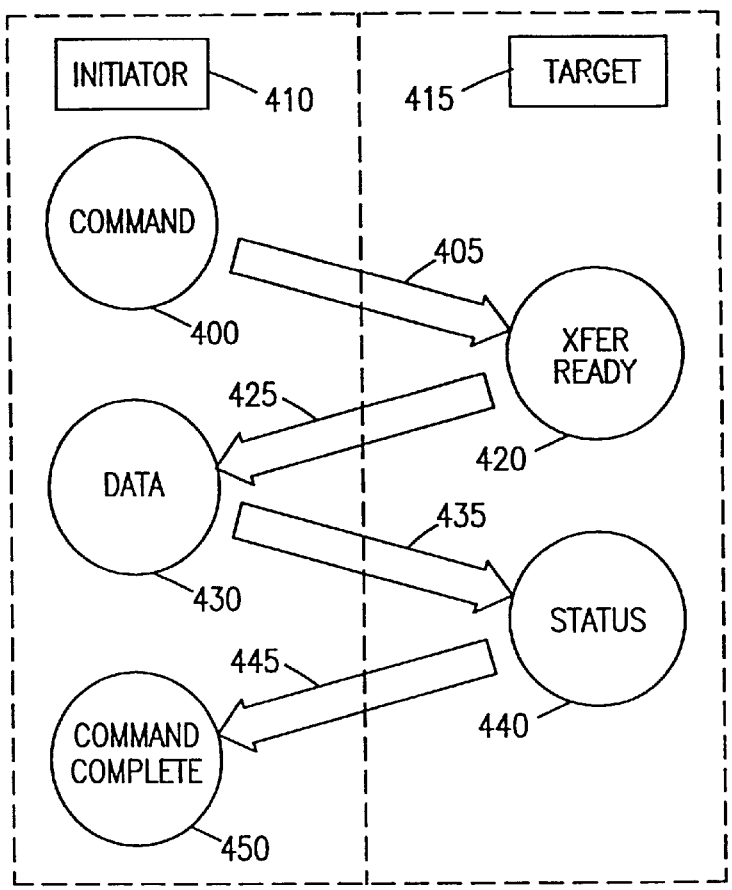
FIG. 4A illustrates a current methodology for transmitting data from an initiator to a target, both of which are disposed in a Fibre Channel environment.
Figure 4B:
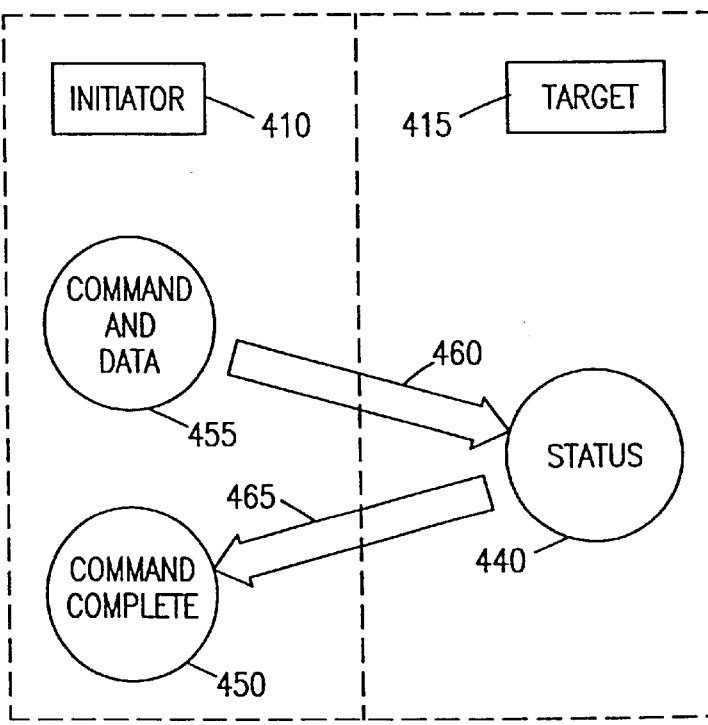
FIG. 4B depicts a scheme for transmitting data from an initiator to a target, both of which are disposed in a Fibre Channel environment, in accordance with the teachings of the present invention.

Referring now to FIG. 4A, there is shown a scheme for a current methodology for effectuating a transaction to transfer data from an initiator 410 to a target 415. Under this scheme, the FC initiator 410 first sends a WRITE command 400 usable in an FC Profile, for example, the FC-SCSI Profile. This is shown in the FIG. 4A as arrow path 405. The initiator 410 then waits for a TRANSFER READY frame 420 to be sent back from the target 415. After winning the loop arbitration for control, the target 415, subsequently, sends this frame 420 to the initiator 410 to indicate that it is ready to receive some or all of the data the initiator 410 wants to send. This step is indicated in FIG. 4A by arrow path 425.

Thereafter, by gaining loop control through arbitration, the initiator 410 can transmit (i.e., write) the DATA frame or frames 430 to the target 415, as shown by arrow path 435. Once all the data has been received, the target 415 will send a STATUS frame 440 to indicate to the initiator 410 that the WRITE command is now completed.

It can be readily appreciated that current Fibre Channel write techniques such as, for example, the methodology discussed above, are inefficient in that they require at least four loop arbitrations for completing a WRITE command. As is known in the art, loop arbitrations may take up a finite amount of time and when the total number of arbitrations per one command completion cycle goes up, the system performance is deteriorated consequently. Further, if the loop topology comprises multiple initiators, or if the loop distance becomes greater because more devices are added to the loop, the WRITE performance is likely to be even more adversely impacted.

Referring now to FIG. 4B, illustrated therein is a methodology system for increasing Fibre Channel performance in accordance with the teachings of the present invention. The initiator 410 is provided with the capability to transmit in one arbitration both WRITE command and DATA frames, collectively referred to as fast write transmission 455, to the target 415 which has the capability to receive such frames. This is shown as arrow path 460. Once the data has been appropriately received by the target 415, a STATUS frame 440 is sent back to the initiator 410, as shown by arrow path 465, to indicate the completion of the fast write transmission 455. As can be understood, this technique eliminates the need for the target 415 to arbitrate and subsequently send the TRANSFER READY frame. Essentially, the total number of the arbitrations needed is reduced substantially in this "fast write" approach, and consequently, it should be appreciated that the system performance is significantly enhanced.

Figure 5:
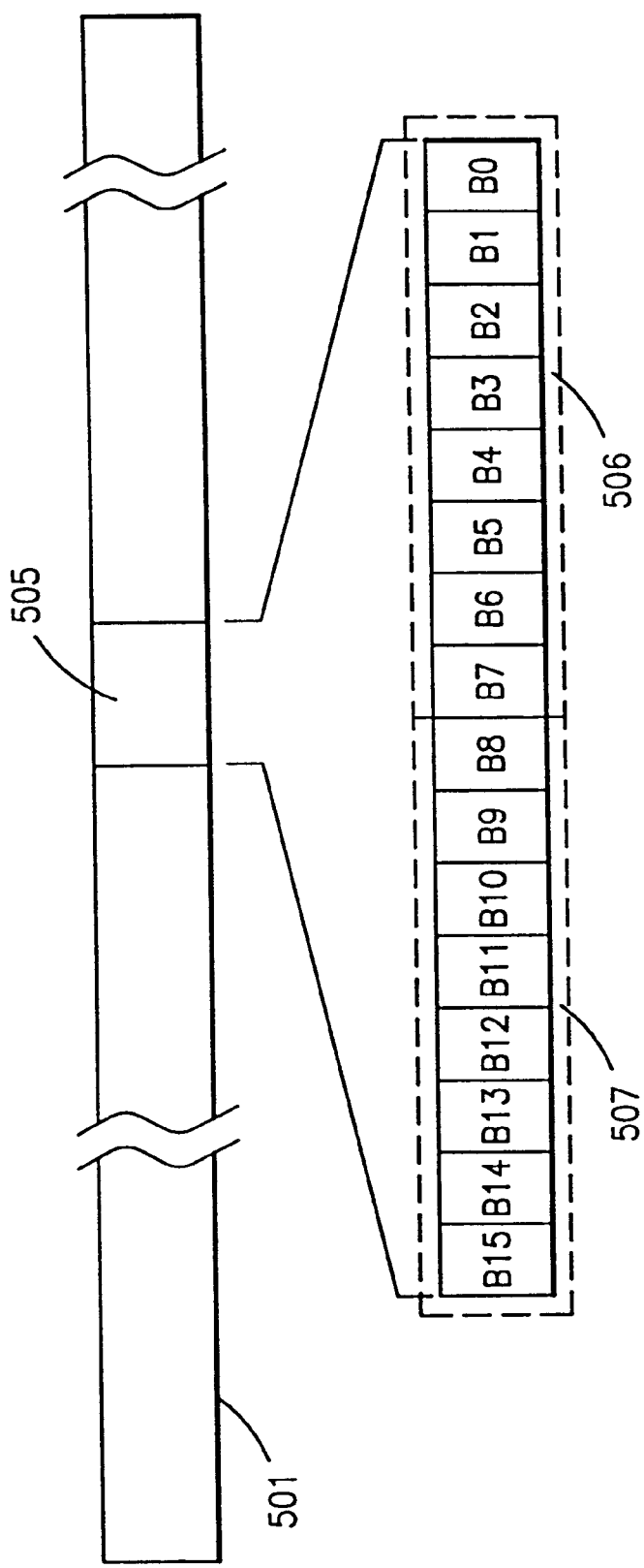
FIG. 5 illustrates a portion of a communication frame provided in accordance with the teachings of the present invention.

Referring now to FIG. 5, there is illustrated a communication frame 501 provided in accordance with the teachings of the present invention to facilitate a fast write in a Fibre Channel environment as described above. The communication frame 501 may be, for example, a request frame such as PLOGI from an initiator, or a response frame such as LS_ACK. The payload of the frame 501 comprises preferably a 16-byte portion 505 for providing vendor_level information unique to the manufacturer/vendor of the transmitting FC device. The 16-byte portion 505 comprises a first sub-portion 506 and a second sub-portion 507. Preferably, each of these two sub-portions comprises 8 bytes. The first sub-portion 506, preferably comprising B0–B7 may be used for vendor specific information.

Continuing to refer to FIG. 5, a target/responder device provided in accordance with the teachings of the present invention may utilize the first sub-portion 506 for identifying various control parameters necessary for facilitating a fast write operation. In a presently preferred exemplary embodiment, the eight bytes of the first sub-portion 506 are utilized in a responder frame as follows. The first four bytes (that is, B0–B3) indicate the maximum amount of data that can be transferred with a WRITE command. The next two bytes (B4 and B5) indicate the first valid RX_ID (described in detail hereinbelow) an initiator/originator that is capable of fast writes can use for the purpose of a fast write. The last two bytes, B6 and B7, indicate to the originator how many RX_IDs have been selected by the responder for preferably the exclusive use by the originator for effectuating fast writes. In a presently preferred exemplary embodiment, however, it is up to the originator to manage the use of these selected RX_IDs.

Still continuing to refer to FIG. 5, an originator provided in accordance with the teachings of the present invention may also utilize, at least in part, the first sub-portion 506 of the communication frame 501. In a presently preferred exemplary embodiment, the first byte B0 is encoded to indicate to a responder that the transmitting originator is amenable for a fast write communication with that responder.

Figure 6:
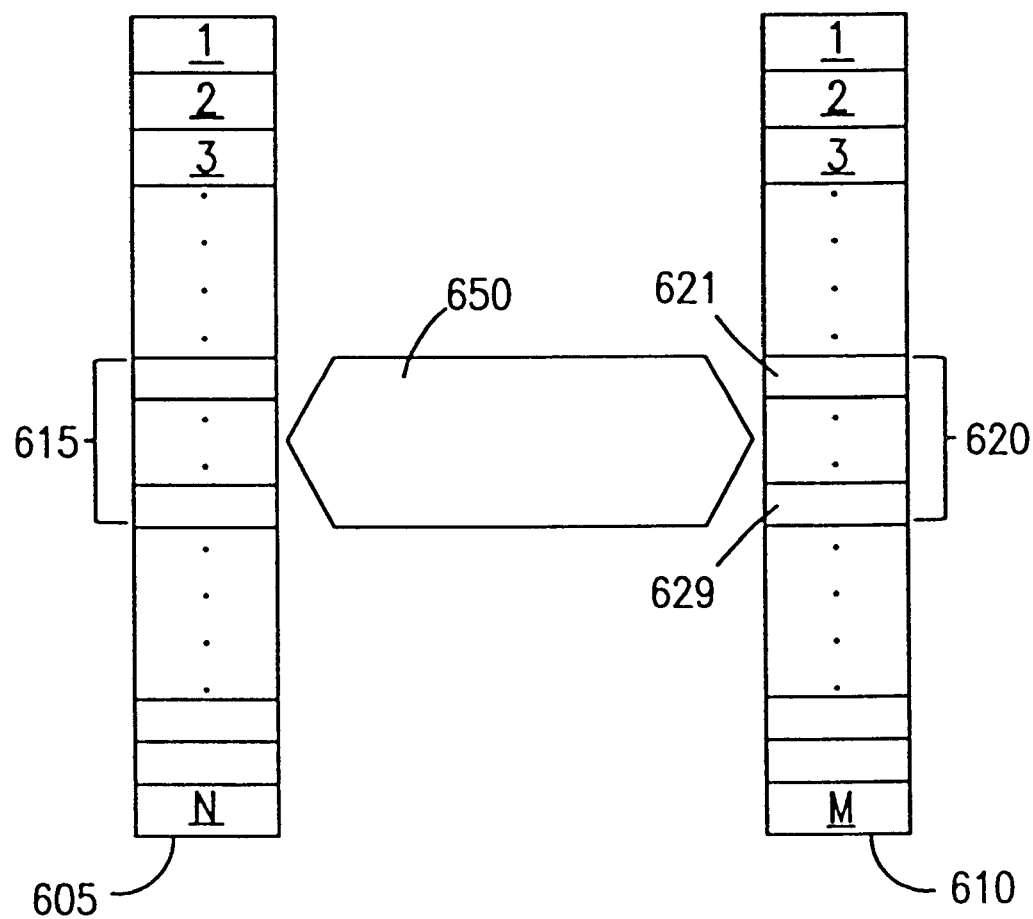
FIG. 6 illustrates exchange_identifier structures for Fibre Channel devices provided in accordance with the teachings of the present invention.

Referring now to FIG. 6, an Originator Exchange Identifier structure (OX_ID index) 605 and a Responder Exchange Identifier structure (RX_ID index) 610 are depicted. The RX_ID index 610, which is provided in a responder, may comprise a certain number of exchange identifiers, for example, RX_ID 1 through RX_ID M, which limit the total number of open exchanges that the responder can handle. A portion of the RX_ID index 610, for example portion 620 comprising a certain range of RX_IDs, may be allocated for facilitating fast write transactions with a particular originator in accordance with the teachings of the present invention. Reference numeral 621 refers to the first valid RX_ID that the particular originator may use for the purpose of a fast write. Reference numeral 629 refers, similarly, to the last RX_ID allocated for that originator. Although not depicted in this FIG., each of the RX_IDs of the index 610 is preferably associated with a resource portion in the responder.

The OX_ID index 605, provided in an originator, may comprise a certain number of OX_IDs, for example, OX_ID 1 through OX_ID N, which limit the total number of open exchanges that the originator can handle. Each of the OX_IDs of the index 605 is preferably associated with a resource portion in the originator. Furthermore, a portion of the OX_ID index 605, denoted as portion 615, may be preferably associated with the RX_ID index portion 620 via some associational mapping 650. This functionality may be provided in the originator at least in part for the purpose of managing the allocated RX_IDs in portion 620, although it should be understood that there could be other ways of managing the same.

Figure 7:
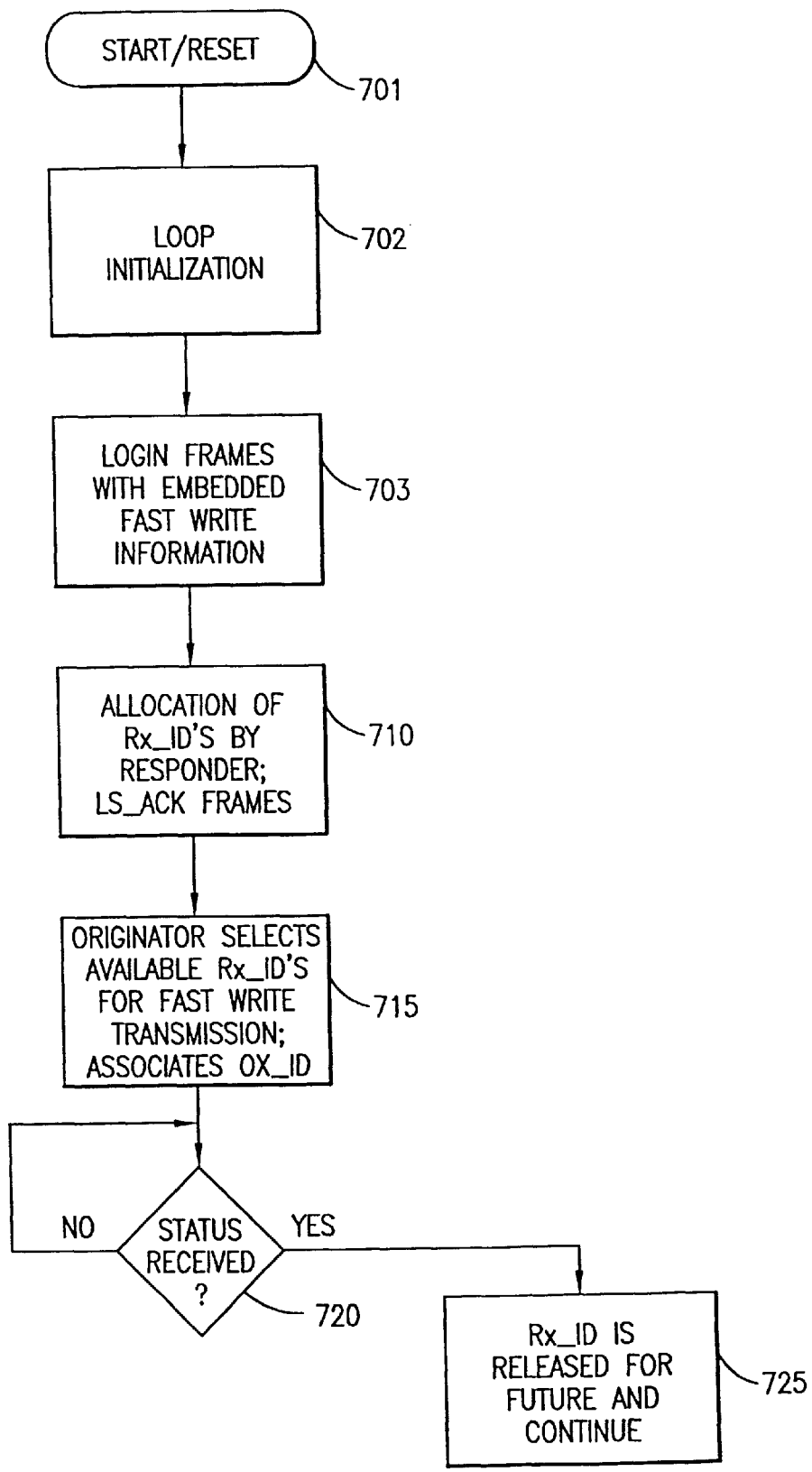
FIG. 7 depicts an exemplary flow diagram for an embodiment of the method of effectuating a data write between an originator and a responder in accordance with the teachings of the present invention.

Referring now to FIG. 7 in conjunction with the foregoing in-depth description, a general operation of the present invention may now be had. As has been described, the process of logging into FC devices is a fairly sequential task. Therefore, a fast-write (FW) capable responder may not know how many originators (FW-capable or otherwise) are on a Fibre Channel Arbitrated Loop until they have all logged into it. In multiple originator environments it may be necessary to ensure that all FW-capable originators have a fair amount of RX_IDs allocated to them by each of the FW-capable and vendor-compatible responders.

After a START/RESET 701, the FC devices undergo a Loop Initialization 702 for the purpose of configuring their AL_PAs. Subsequently, the originators engage in a Login process wherein PLOGI frames of FW-capable devices contain embedded information to indicate to responders of their FW-capability. These processes are lumped together in step 703. A responder that is capable of fast writes in accordance with the teachings of the present invention allocates a selected number of RX_IDs from its RX_ID index for the exclusive use of a particular FW originator. This critical information is embedded in the vendor_ specific portions of the LS_ACK frame that is transmitted by the responder to the originator.

After receiving the critical information from FW-capable responders, the originator associates a portion of its OX_ID index with the allocated RX_IDs from a responder for the purpose of managing the use thereof. These actions are denoted as step 715.

It is possible that a responder may initiate an LIP step 702 based on certain conditions. For example, when an originator logs into a compatible responder before other originators, that originator may be given the full allocation of RX_IDs which support fast writes. If subsequent originators log into that responder after a selected time-out period has elapsed, the LS_ACK frames returned by it may indicate the unavailability of FW-capable RX_IDs. In this situation the responder may detect that there is more than one originator on the Arbitrated Loop that is logged into it. It may preferably be provided that when a responder detects this condition the responder may initiate a LIP step 702 so that all the originators log back into the responder. The responder, having knowledge of how many originators are present of the Loop, may now allocate its RX_ID index portions accordingly.

Continuing to refer to FIG. 7, after COMMAND and DATA frames are received by a responder pursuant to a fast write, it may send a STATUS frame back to the originator to indicate command completion, as provided in the decision block 720. The originator may then release the RX_ID used for that fast write command and re-associate it for future use as indicated in step 725.

If the originator provided in accordance with the teachings of the present invention wants to write data larger than the COMMAND/DATA frames allow, or if the originator has run out of its allocated FW-capable RX_IDs, it may simply default to issuing the WRITE Command and wait for the TRANSFER READY Frame to come back in the conventional manner. The same default option may also be provided for a vendor-specific, FW-capable originator wanting to transmit data to a responder from a different vendor.

It should now be appreciated by those skilled in the art that the present invention successfully overcomes the problems of the current data transfer techniques usable in Fibre Channel environments. In accordance with the teachings of the invention, data may be written to a receiving device with significant efficiency. As can be appreciated, this enhanced efficiency contributes to increased performance which may be more notable in large Loops (with or without multiple initiators) where loop latency is more noticeable.

Although only certain embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a Fibre Channel (FC) communication environment, which environment inlcudes two or more originators and at least one responder, a method for transferring data from said originator to said responder, comprising steps of:

sending a write command and at least one data frame together from said two or more originators to said responder;

transmitting a status frame from said responder to said originator, wherein said status frame is provided in response to the completion of said sending step;

dynamically allocating a plurality of selected portions of a Responder-Exchange-Identifier (RX_ID) index associated with said responder, said index comprising a plurality of Responder-Exchange-Identifiers (RX_Ids), each of the plurality of selected portions of the Responder-Exchange-Identifiers being allocated to a respective originator; and transmitting information to said originators, said information being related to said plurality of selected portions.

2. The method as recited in claim 1, wherein said transmitting step is effectuated via a portion of a payload associated with a frame provided by said responder.

3. A system for transferring data in a Fibre Channel (FC) communication environment, comprising:

two or more originators for initiating a transfer of data; and a responder for receiving said data, wherein said respondent dynamically allocates a plurality of selected portions of a plurality of Responder-Exchange-Identifiers for the exclusive use of said two or more originators pursuant to said transfer of said data such that said two or more originators can send command and data frames together to said responder.

4. The system as recited in claim 3, wherein said two or more originators comprise a means for managing the use of said selected portions of said plurality of Responder-Exchange-Identifiers.

5. The system as recited in claim 3, wherein said two or more originators comprise an Originator-Exchange-Identifier (OX_ID) index.

6. The system as recited in claim 5, wherein a portion of said OX_ID index is associated with said plurality of selected portions of said plurality of Responder-Exchange-Identifiers.

7. The system as recited in claim 3, wherein the use of said plurality of selected portions of said plurality of Responder-Exchange-Identifiers is managed by said originator.

8. A method for increasing write performance in a Fibre Channel Arbitrated Loop, comprising of:

dynamically allocating a plurality of selected portions of a plurality of Responder-Exchange-Identifiers in a target for the exclusive use of two or more initiators;

transmitting information to said two or more initiators, said information being related to said plurality of Responder-Exchange-Identifiers;

sending COMMAND and DATA frames together from said two or more initiators, to said target, said frames being tagged with a Responder-Exchange-Identifier belonging to said plurality of selected portions; and transmitting a STATUS frame from said target to said two or more initiators, indicating the completion of said sending step.

9. The method as recited in claim 8, further comprising the step of associating a portion of a plurality of Originator-Exchange-Identifiers in said two or more initiators with said selected portion of said plurality of Responder-Exchange-Identifiers.

10. The method as recited in claim 8, further comprising the step of managing the use of said selected portion of said plurality of Responder-Exchange-Identifiers by said two or more initiators.

11. A method of dynamically allocating resources in a Fibre Channel environment, comprising the acts of:

(a) providing a Fibre Channel loop comprising one or more originators and two or more targets, each initiator comprising a plurality of resources;

(b) initializing the originators and the targets;

(c) determining the number of targets capable of communicating with a originator;

(d) re-initializing the loop; and (e) allocating a portion of a Responder-Exchange-Identifier index for use by a single originator.

12. The method, as set forth in claim 11, wherein act (c) comprises the act of sending a PLOGI frame from each target to the originator, wherein the PLOGI frame comprises embedded information regarding fast write capabilities of the target.

* * * * *